(12) United States Patent
Zerman et al.

(10) Patent No.: US 10,860,095 B2
(45) Date of Patent: Dec. 8, 2020

(54) DYNAMIC EYE-TRACKING CAMERA ALIGNMENT UTILIZING EYE-TRACKING MAPS

(71) Applicant: Cognixion, Santa Barbara, CA (US)

(72) Inventors: Leonard Zerman, Santa Barbara, CA (US); Andreas Forsland, Santa Barbara, CA (US)

(73) Assignee: Cognixion, Santa Barbara, CA (US)

( * ) Notice: Subject to any disclaimer, the term of this patent is extended or adjusted under 35 U.S.C. 154(b) by 0 days.

(21) Appl. No.: 16/401,918

(22) Filed: May 2, 2019

(65) Prior Publication Data
US 2020/0348752 A1    Nov. 5, 2020

(51) Int. Cl.
  *G06F 3/01*  (2006.01)
  *G06T 7/20*  (2017.01)
  *G06F 3/0484*  (2013.01)

(52) U.S. Cl.
  CPC ............ *G06F 3/013* (2013.01); *G06F 3/017* (2013.01); *G06F 3/04842* (2013.01); *G06T 7/20* (2013.01); *G06F 2203/04806* (2013.01)

(58) Field of Classification Search
  CPC ...... G06F 3/013; G06F 3/017; G06F 3/04842; G06F 2203/04806; G06F 3/0481; G06F 3/0482; G06F 3/0483; G06T 7/20
  See application file for complete search history.

(56) References Cited

U.S. PATENT DOCUMENTS

| | | | |
|---|---|---|---|
| 4,836,670 A | 6/1989 | Hutchinson | |
| 5,360,971 A | 11/1994 | Kaufman et al. | |
| 6,152,563 A | 11/2000 | Hutchinson et al. | |
| 7,130,447 B2* | 10/2006 | Aughey | A61B 3/113 382/103 |
| 8,235,529 B1 | 8/2012 | Raffle et al. | |
| 8,885,882 B1* | 11/2014 | Yin | G06F 3/00 382/103 |
| 9,271,648 B2* | 3/2016 | Durnell | A61B 3/113 |
| 10,029,700 B2* | 7/2018 | Roth | H04M 3/543 |
| 10,379,612 B1* | 8/2019 | Bonnier | G06F 3/0304 |
| 2005/0100215 A1* | 5/2005 | Nygaard, Jr. | G01R 13/029 382/181 |
| 2008/0130950 A1 | 6/2008 | Miklos et al. | |
| 2011/0170067 A1 | 7/2011 | Sato et al. | |
| 2011/0178784 A1 | 7/2011 | Sato et al. | |
| 2013/0114850 A1 | 5/2013 | Publicover et al. | |
| 2013/0135204 A1 | 5/2013 | Raffle et al. | |

(Continued)

Primary Examiner — Arpan P. Savla
Assistant Examiner — Erik V Stitt
(74) Attorney, Agent, or Firm — Rowan TELS LLC

(57) ABSTRACT

A method of real-time eye tracking feedback with an eye-movement tracking camera includes receiving a left eye movement transform, a right eye movement transform, and gaze direction information from a user's face and user's eyes. An eye tracking map is constructed including the left eye movement transform and the right eye movement transform. The eye tracking map is displayed with the left eye movement information, the right eye movement information, and the gaze direction information on a device screen. Feedback is provided to the user related the left eye movement transform, the right eye movement transform, and the gaze direction information.

19 Claims, 13 Drawing Sheets

(56) References Cited

U.S. PATENT DOCUMENTS

| | | | |
|---|---|---|---|
| 2013/0169530 A1* | 7/2013 | Bhaskar | G06F 3/012 345/157 |
| 2015/0190048 A1* | 7/2015 | Huang | A61B 3/024 351/239 |
| 2017/0336865 A1* | 11/2017 | Meyer | G06F 3/013 |
| 2018/0300589 A1* | 10/2018 | Levinshtein | G06K 9/00268 |

\* cited by examiner

DYNAMIC EYE-TRACKING CAMERA ALIGNMENT UTILIZING EYE-TRACKING MAPS

BACKGROUND

Eye tracking based communication programs offer individuals with limited mobility the ability to communicate through the movement of their eyes by correlating the eye movement and positioning to locations on a screen. These programs operate by selection-based interactions correlated to the user's eye position and movement in order to allow the user to select an option displayed through a user interface. These can suffer from alignment issues that result when the user's eyes are looking away from the corresponding screen or do not line up with the programs interpreted location. These alignment issues occur frequently while the user is learning how to operate the program. Therefore, a need exists for feedback system for tracking a user's eye positioning and movement.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
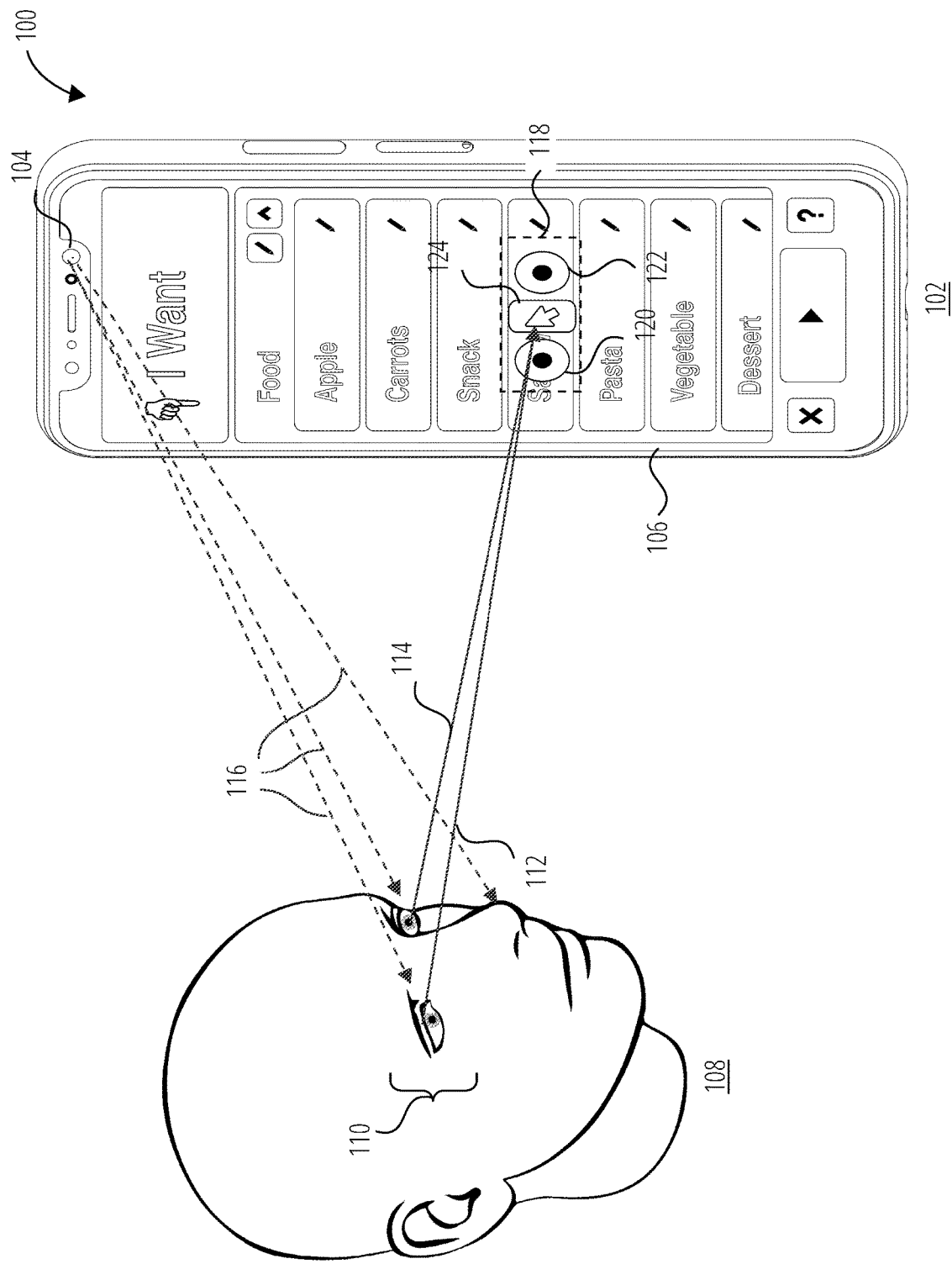
FIG. 1 illustrates a system 100 in accordance with one embodiment.

A system for real-time eye tracking feedback with an eye-movement tracking camera creates a human-centric dynamic eye-tracking camera alignment soft-device utilizing an eye-tracking map on a device.

The concept of an eye tracking map may be viewed analogous to a video games mini-map that allows the player to know their relative location in the virtual world, as the eye tracking map allows the user to identify the position of their eye relative to the interpreted focal point on the device. The eye tracking map may be configured with a circular shaped profile to graphically represent the eyeball with a smaller enclosed circle in the center representing the positioning of the pupil relative to the position of the tracked eye pupils.

The eye tracking map may be utilized with eye tracking based communication programs which offer individuals with limited mobility the ability to communicate through the movement of their eyes by correlating the eye movements and positioning to locations on a screen. These programs operate by selection-based interactions correlated to the user's eye position and movement in order to allow the user to select an option displayed through a user interface.

The system may attach the eye tracking maps to an eye tracking pointer allowing for feedback to be provided to the user in the center of their visual focus area while also allowing the eye tracking cameras to identify the user's eye positioning.

The eye tracking maps may handle a large range of user's skill sets and abilities and therefor have a wide range of configurability for individualization to reflect that diversity and increasing skill mastery over time. For a beginner onboarding for the first-time with the eye tracking based communications program, there are configurations that may help them quickly achieve good eye camera alignment and have early skill success and that facilitates adoption of the eye tracking based communications program. As skill is gained, the user may "fade" the eye tracking maps through alpha channel transparency blending of the eye tracking maps in order to maintain feedback but limit its interference with the displayed content. The eye tracking maps may be configured such that a user may opt to turn-off the eye tracking maps or chose a highly transparent alpha blend. The eye tracking maps may also be configured to be affixed to location on the center of the display.

Some configurations for the eye tracking map may include toggling their visibility on/off, allowing for alpha channel transparency blending, modification of the colors of the eye tracking map, modification of the size of the eye tracking map, modification of the distance between the pointer and the eye tracking map, modification of the positioning of the eye tracking map such that the eye tracking maps are side by side above or below the eye tracking pointer, allowing the eye tracking map to be enlarged and affixed as a large transparency near the center of the screen.

In some configurations, eye tracking maps may not be part of a size or hit-area calculation of the eye tracking pointer even when attached to the motion of the eye tracking pointer. Eye tracking pointer operation may be independent of eye tracking map use or display. The eye tracking pointer's behaviors may remain in the configuration with its independent set of adjustments set within an eye tracking based communications program.

In some configurations, the eye tracking feature utilized in the eye tracking map may be accomplished utilizing three functions that look at the eye movement transformation of the left eye, right eye, and the focal point from the user. These functions may be referred to as leftEyeTransform, rightEyeTransform, and lookAtPoint, respectively.

The leftEyeTransform and rightEyeTransform may utilize the tracked movement of the user's eyes to determine positioning and movement of the user's left and right eye respectively. The lookAtPoint function may utilize the leftEyeTransform and rightEyeTransform to calculate lookAtPoint. One problem that arises from calculating the lookAt- Point is that when the eye camera alignment "loses track" of an eye, the lookAtPoint begins to generate incorrect positional data.

In some instances, if the eye camera alignment is such that (left|right)EyeTransform loses track of an eye, the eye tracking map pupil pointers, corresponding to the eye movement/positional information for each eye, can disappear notifying the user that their eyes are out of alignment. In another configuration, the pupil pointer colors may change depending on the alignment state of the user's eyes. For instances, if the user is in alignment, the pupil pointer colors may be shown as green, while when the user's eyes are out of the alignment the pupil pointer colors may be represented in red. Other implementations could hide the eye tracking pointer indicating a loss of tracking event.

FIG. 1 illustrates a system 100 for real-time eye tracking feedback with an eye-movement tracking camera. The system 100 includes a device 102 comprising an image sensor 104 and a device screen 106. The image sensor 104 is operatively disposed towards a user's face 108 to capture right eye movement transform 112 and left eye movement transform 114 as well as gaze direction information 116 from a user's eyes 110. The system 100 generates an eye tracking map and pointer 118 on the device screen 106 where the position of the eye tracking map and pointer 118 is correlated to gaze direction information 116 and eye movement transforms from the user. The eye tracking map of the eye tracking map and pointer 118 displays left eye movement information 120 and right eye movement information 122. The eye tracking map and pointer 118 additionally displays an eye tracking pointer 124 that represents the focal point of the gaze position of the user's eyes after the eye movements. The eye tracking map and pointer 118 may be overlaid above a user interface menu for communicating information.

Figure 2:
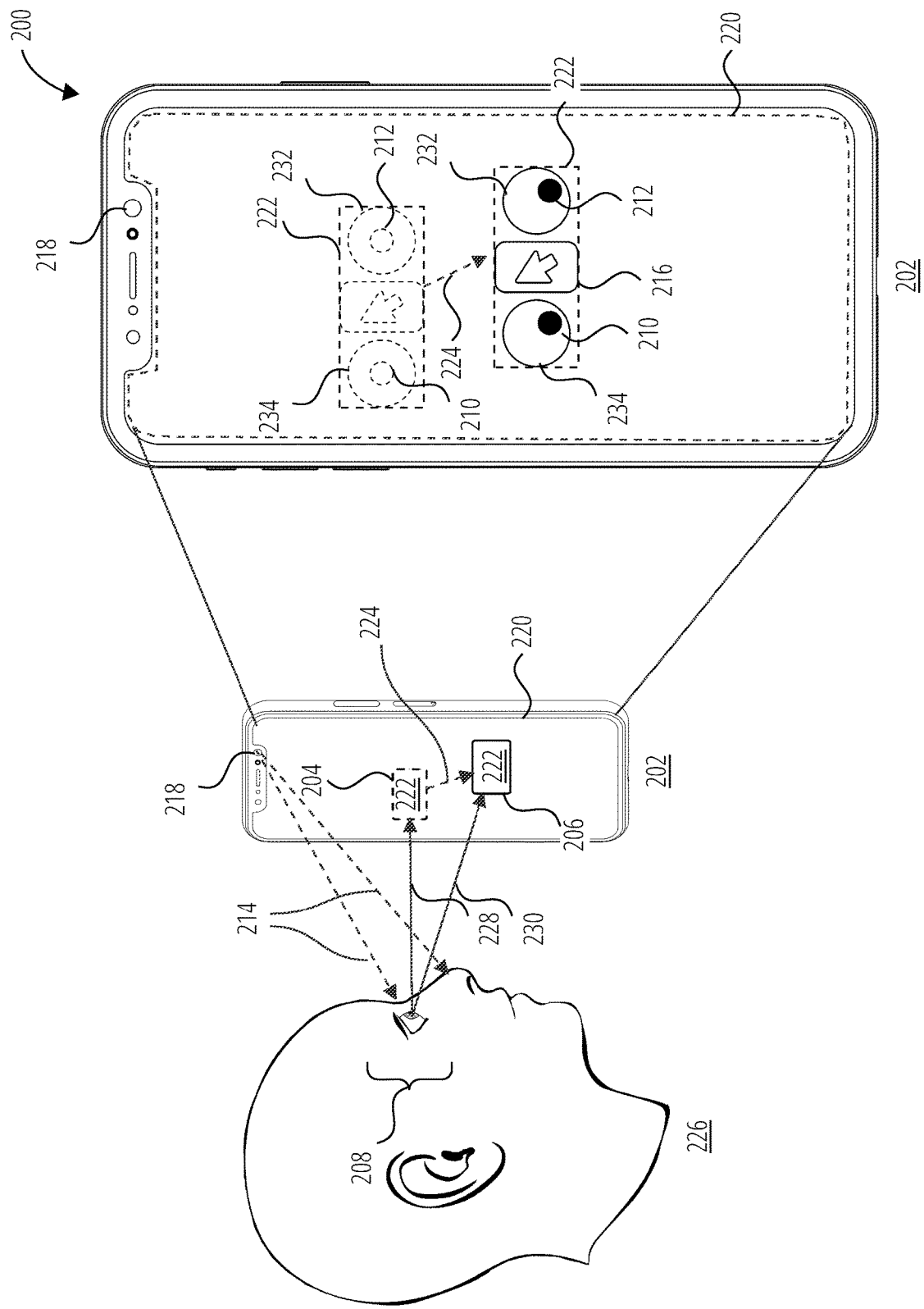
FIG. 2 illustrates a system 200 in accordance with one embodiment.

FIG. 2 illustrates a system 200 for real-time eye tracking feedback with an eye-movement tracking camera. The system 200 includes a device 202 with an image sensor 218 disposed towards a user's face 226 in order to capture the position of the user's eyes and gaze direction information 214 from the user's face 226 and the user's eyes 208.

With the user positioned for viewing the device screen 220, the system 200 utilizes the eye movement transformations relative to the gaze direction information 214 to construct an eye tracking map and pointer 222 that are displayed on the device screen 220 at a point correlated to the user's focal point. When the image sensor 218 detects changes in at least the eye movement transformations and/or the gaze direction information, the system 200 updates the position of the eye tracking map and pointer 222 displayed on the device screen 220. The position of the user's eyes 208 relative to eye tracking map and pointer 222 may be represented in the eye tracking map and pointer 222 as a left eye movement information 210 and right eye movement information 212 in a left eye tracking map 234 and a right eye tracking map 232 positioned adjacent to an eye tracking pointer 216. When the user is looking directly at the device screen 220 the left eye movement information 210 and the right eye movement information 212 may be found in the center of the left eye tracking map 234 and the right eye tracking map 232, respectively. As the user changes their eye position without changing their gaze to view something on the lower part of the device screen 220, the left eye movement information 210 and the right eye movement information 212 may show the corresponding change in eye position in the left eye tracking map 234 and the right eye tracking map 232. In a static situation, the right eye movement information may correspond to a right eye position with respect to the eye tracking map, and the left eye movement information may correspond to a left eye position with respect to the eye tracking map.

For instance, the image sensor 218 captures the eye movement transform 228 and the gaze direction information 214 and displays the eye tracking map and pointer 222 on the device screen 220 at a first position 204. Since the first position 204 is directly in front of the user's face 226 and the user's eyes 208, the right eye movement information 212 and the left eye movement information 210 are displayed as being in the center of the right eye tracking map 232 and the left eye tracking map 234, respectively. As the image sensor 218 continues to capture information from the user's face 226 and the user's eyes 208, the image sensor 218 receives eye movement transform 230 and moves eye tracking map and pointer 222 from the first position 204 to the second position 206 on the device screen 220 corresponding to the eye movement 224 of the user's eyes 208. The left eye movement information 210 and the right eye movement information 212 change to reflect the new eye positioning by showing the left eye movement information 210 and the right eye movement information 212 pointing towards the lower right of the left eye tracking map 234 and the right eye tracking map 232.

Figure 3:
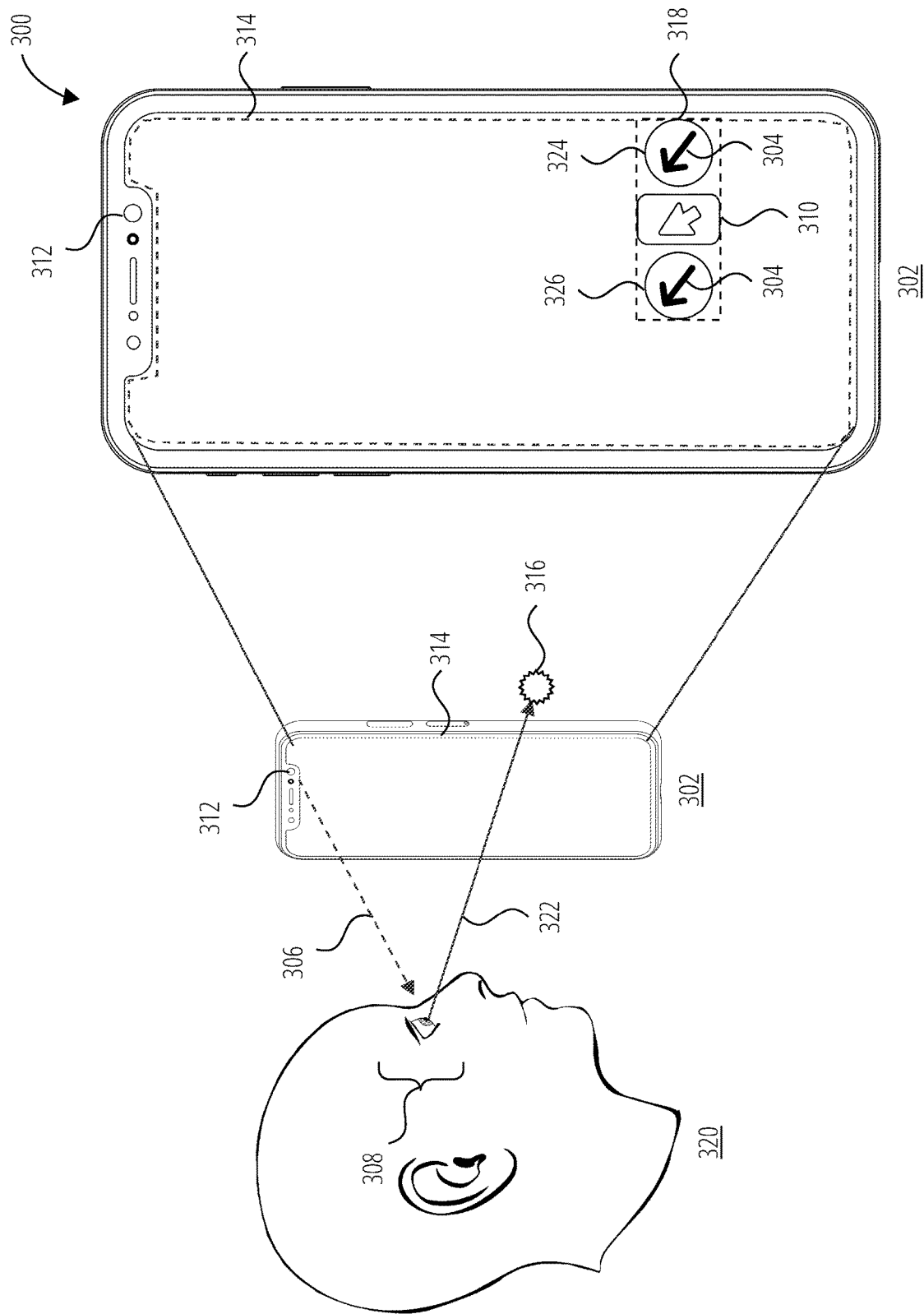
FIG. 3 illustrates a system 300 in accordance with one embodiment.

FIG. 3 illustrates a system 300 for real-time eye tracking feedback with an eye-movement tracking camera. The system 300 includes a device 302 comprising an image sensor 312 and a device screen 314 positioned in front of a user's face 320 and user's eyes 308. The image sensor 312 receives gaze direction information 306 and eye movement transform 322 to generate an eye tracking map and pointer 318 on the device screen 314. In some instances, the user's eye movement may be interpreted by the system 200 as corresponding to a location that is outside of the bounds of the device screen 314 and may generate feedback instructions 304 for the user. For instance, the image sensor 312 may detect the eye movement transform 322 with the gaze direction information 306 that is interpreted as a focal point 316 that is outside of the device screen 314. In this situation, the eye tracking map and pointer 318 may display the feedback instructions 304 in the left eye tracking map 326 and the right eye tracking map 324 indicating to the user to move the device or their eyes in a certain direction to be aligned again with the device screen 314. The eye tracking map and pointer 318 with the left eye tracking map 326, eye tracking pointer 310, and right eye tracking map 324 may be positioned at the last on-screen position of the eye tracking map and pointer 318.

Figure 4:
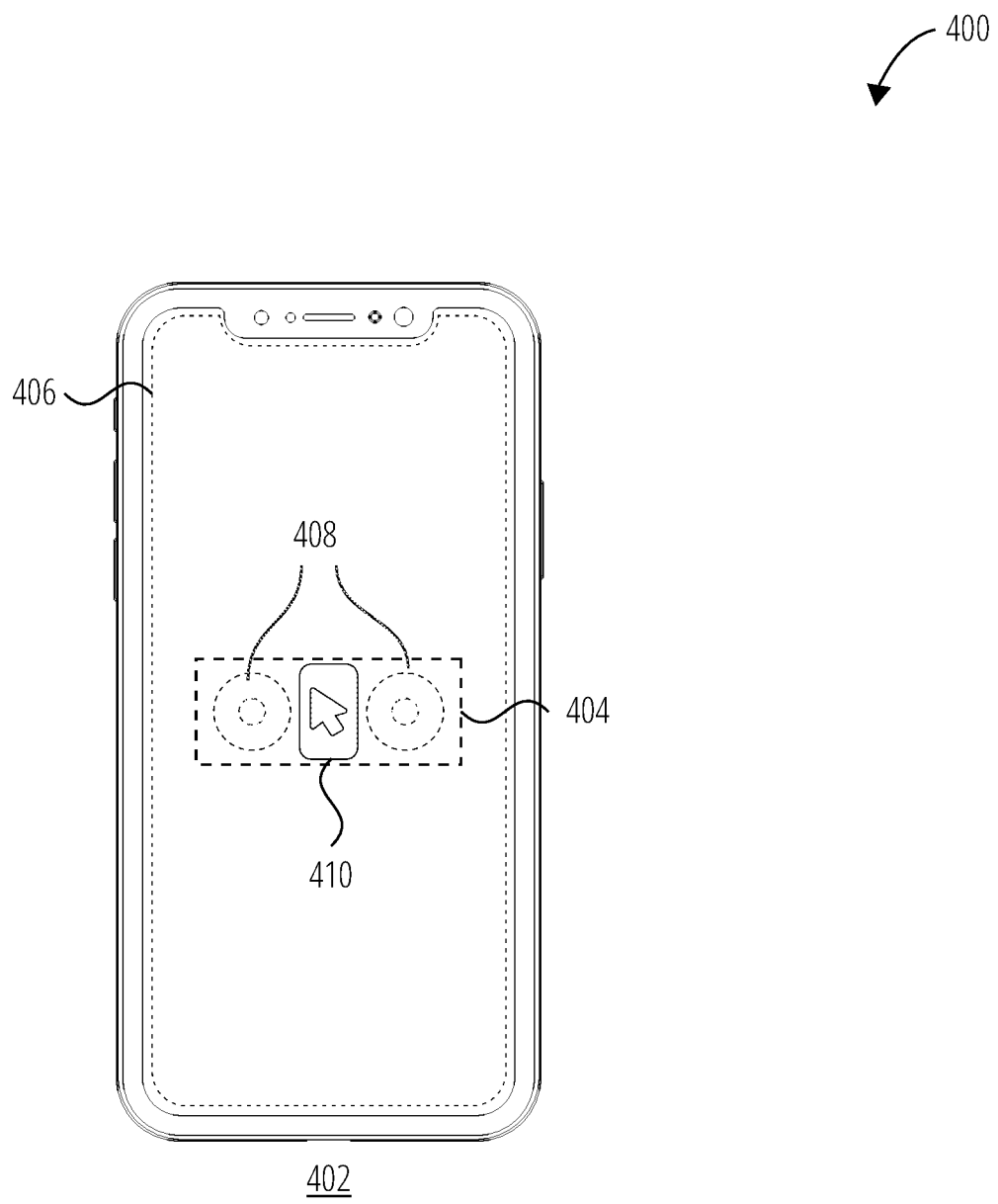
FIG. 4 illustrates a system 400 in accordance with one embodiment.

FIG. 4 illustrates a system 400 for real-time eye tracking feedback with an eye-movement tracking camera. The system 400 comprises a device 402 with a device screen 406 showing a configuration of the eye tracking map and pointer 404. The eye tracking map and pointer 404 comprises an eye tracking map 408 with its visibility reduced or turned off relative to the visibility of the eye tracking pointer 410. This configuration may be set by a user to improve visibility of the content displayed of the device screen 406.

Figure 5:
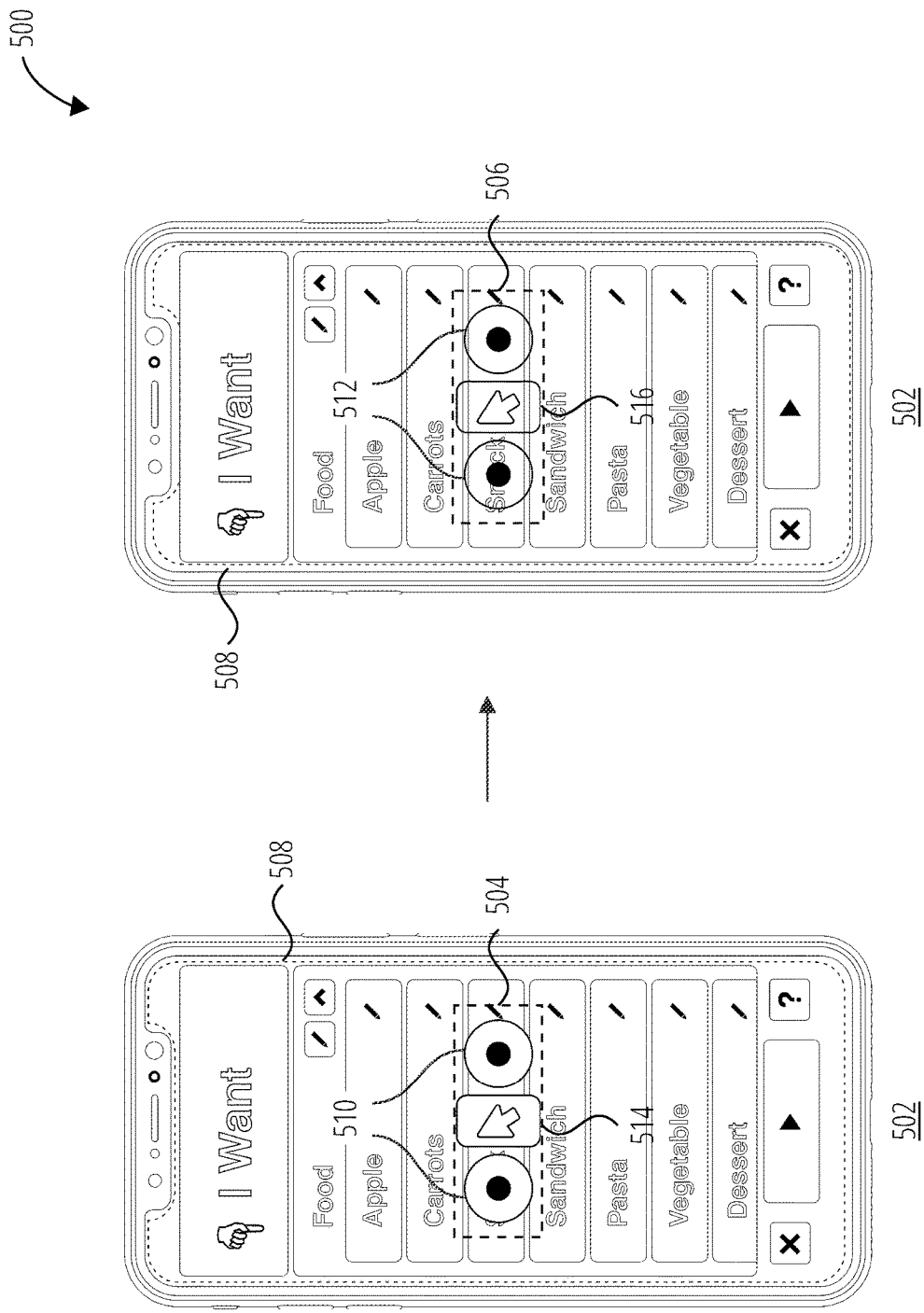
FIG. 5 illustrates a system 500 in accordance with one embodiment.

FIG. 5 illustrates a system 500 for real-time eye tracking feedback with an eye-movement tracking camera. The system 500 comprises a device 502 with a device screen 508 displaying a configuration of the eye tracking map and pointer allowing for alpha channel transparency blending with the content displayed on the device screen 508. An eye tracking map and pointer 504 shows an eye tracking pointer 514 and an eye tracking map 510 at full opacity blocking view of the content displayed on the device screen 508. After applying the alpha channel transparency blending, the eye tracking map and pointer 504 is transformed into the eye tracking map and pointer 506 showing transparent eye tracking pointer 516 and eye tracking map 512 allowing for the visibility of the content displayed on the device screen 508.

Figure 6:
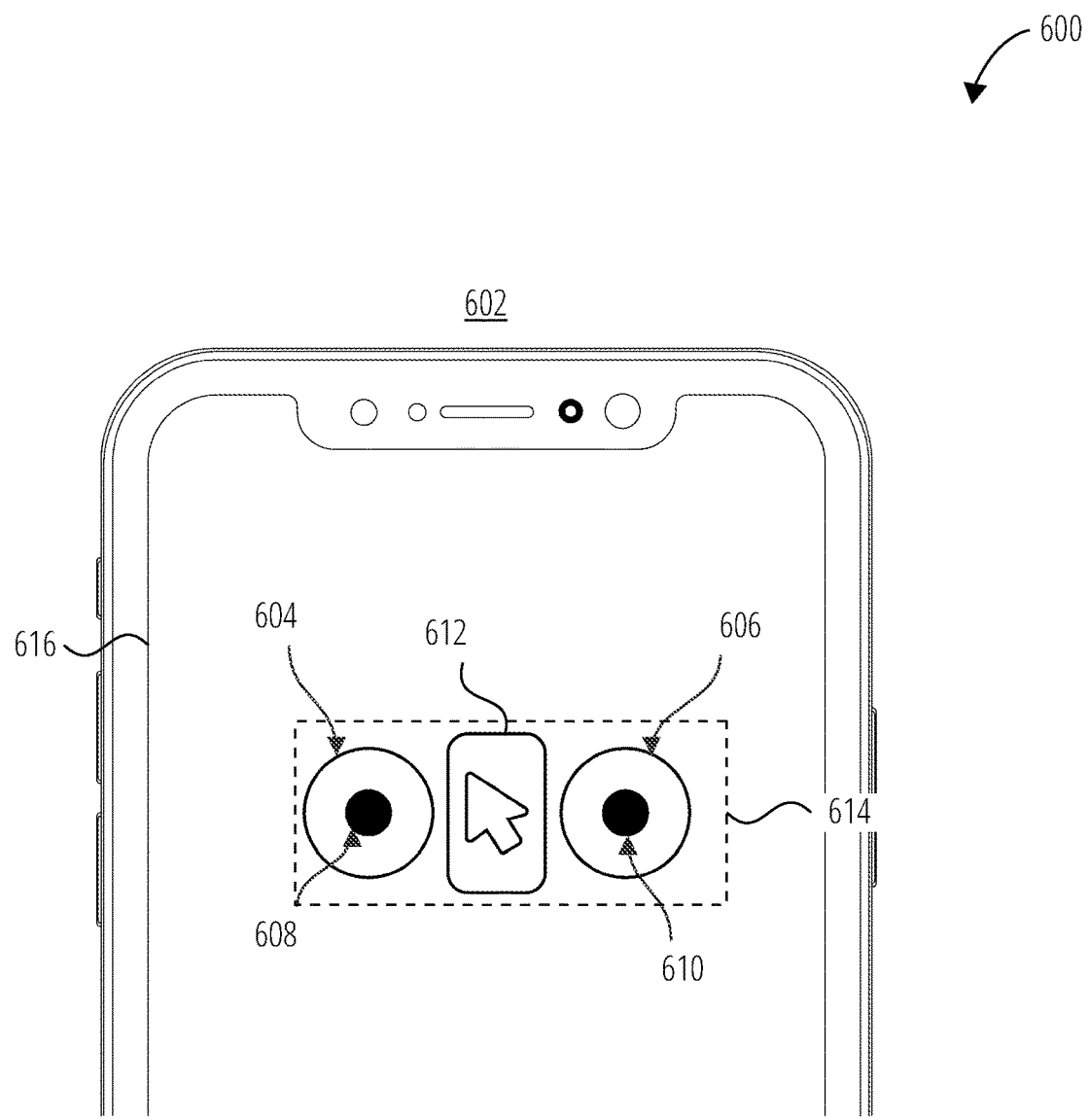
FIG. 6 illustrates a system 600 in accordance with one embodiment.

FIG. 6 illustrates a system 600 for real-time eye tracking feedback with an eye-movement tracking camera. The system 600 comprises a device 602 with a device screen 616 and allows for color configuration of the eye tracking map and pointer 614. In this configuration, the left eye tracking map boundary line 604, the right eye tracking map boundary line 606, the left eye location 608, the right eye location 610, and the eye tracking pointer 612 may be modified to improve visibility against content displayed on the device screen 616. Different colors may also be triggered based on certain conditions, such as alerting the user their gaze is outside the device screen 616.

Figure 7:
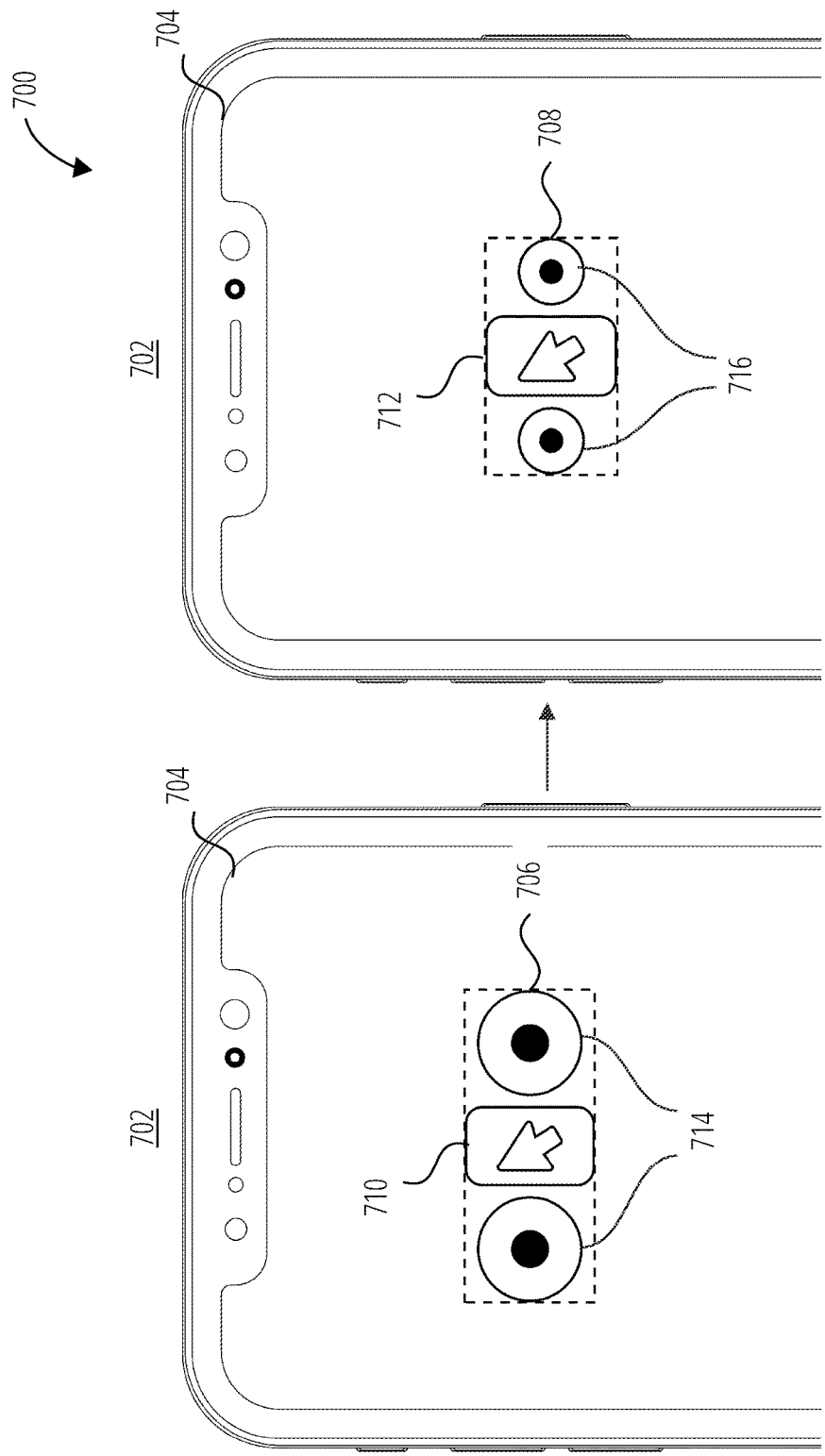
FIG. 7 illustrates a system 700 in accordance with one embodiment.

FIG. 7 illustrates a system 700 for real-time eye tracking feedback with an eye-movement tracking camera. The system 700 comprises a device 702 with a device screen 704 displaying an eye tracking map and pointer with configurable eye tracking map size. An eye tracking map and pointer 706 is shown with an eye tracking pointer 710 and an eye tracking map 714 at a first size. The eye tracking map may be increased or decreased in size relative to the eye tracking pointer. For instance, the eye tracking map and pointer 708 show eye tracking map 716 and eye tracking pointer 712, with the eye tracking map 716 being a smaller size compared to the eye tracking map 714 while the eye tracking pointer 712 and the eye tracking pointer 710 are the same size. The configurable sizing of the eye tracking map and pointer may be utilized to modify the size of the eye tracking map, the eye tracking pointer, or a combination thereof.

Figure 8:
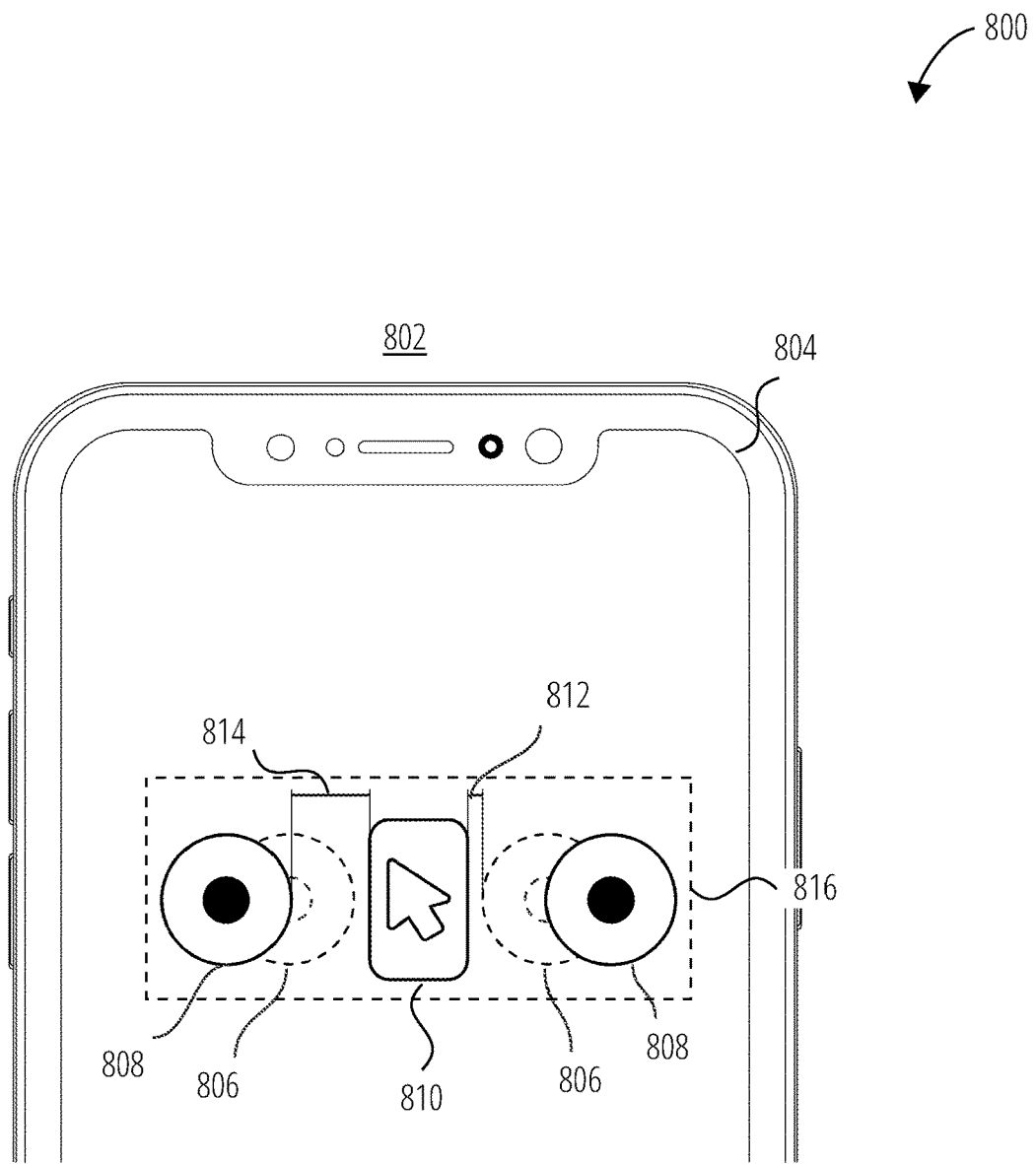
FIG. 8 illustrates a system 800 in accordance with one embodiment.

FIG. 8 illustrates a system 800 for real-time eye tracking feedback with an eye-movement tracking camera. The system 800 comprises a device 802 with a device screen 804 displaying a configuration of the eye tracking map and pointer 816 allowing for the spacing of the eye tracking map from the eye tracking pointer 810. Eye tracking map 806 and eye tracking map 808 have different distances from the eye tracking pointer 810, with the distance 812 separating the eye tracking map 806 from the eye tracking pointer 810 and a distance 814 separating the eye tracking map 808 from the eye tracking pointer 810.

Figure 9:
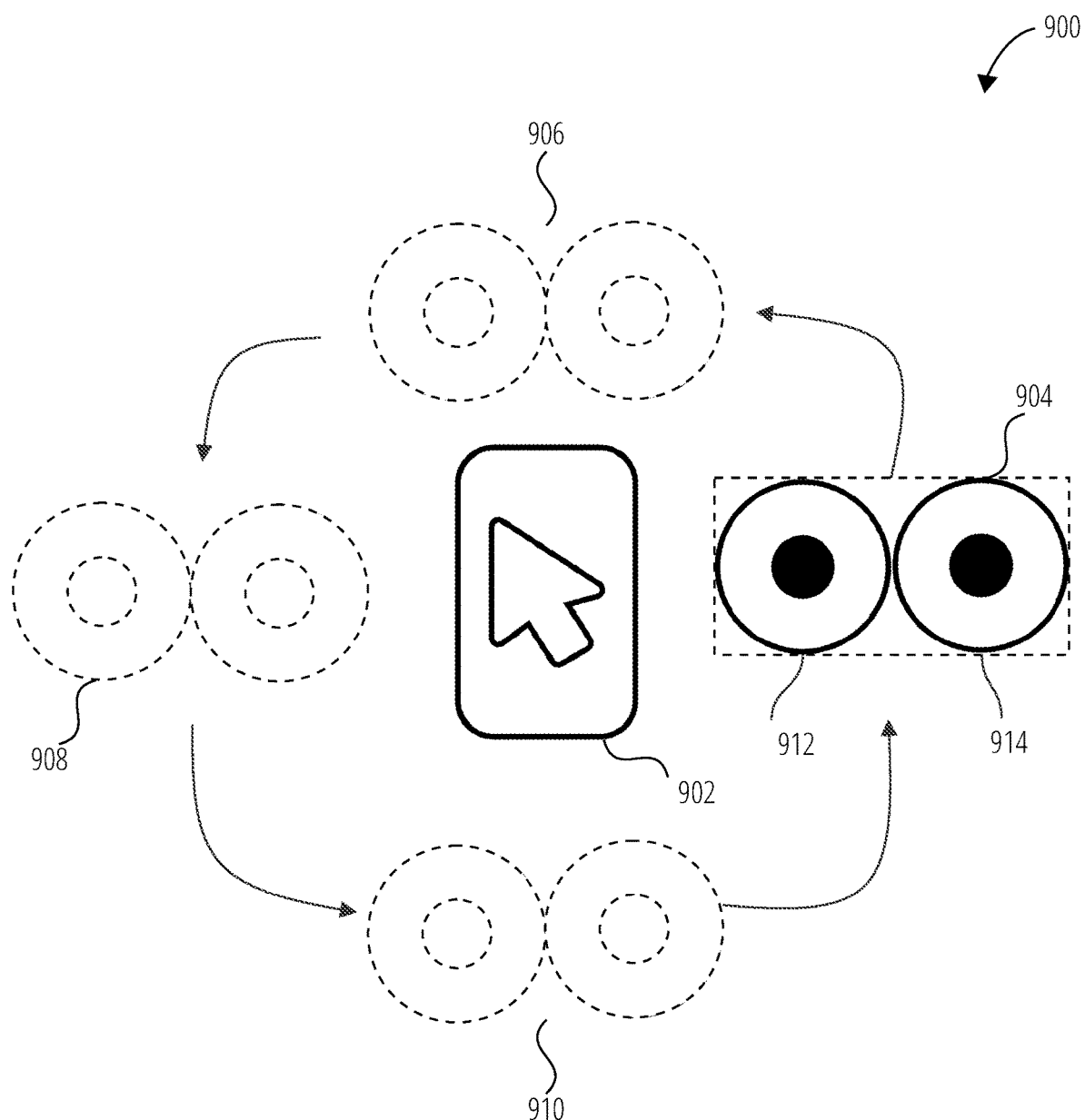
FIG. 9 illustrates an eye tracking map and pointer 900 in accordance with one embodiment.

FIG. 9 illustrates an eye tracking map and pointer 900 for real-time eye tracking feedback with an eye-movement tracking camera. In one configuration, eye tracking map and pointer 900 may allow for the left eye tracking map 912 and the right eye tracking map 914 to be positioned side by side on one side of the eye tracking pointer 902. In this configuration, the eye tracking map 904 may be repositioned around the eye tracking pointer 902 such as to the right of the eye tracking pointer 902 (current position) above the eye tracking pointer 902 (position 906), to the left of the eye tracking pointer 902 (position 908), below the eye tracking pointer 902 (position 910), as well any position in between.

Figure 10:
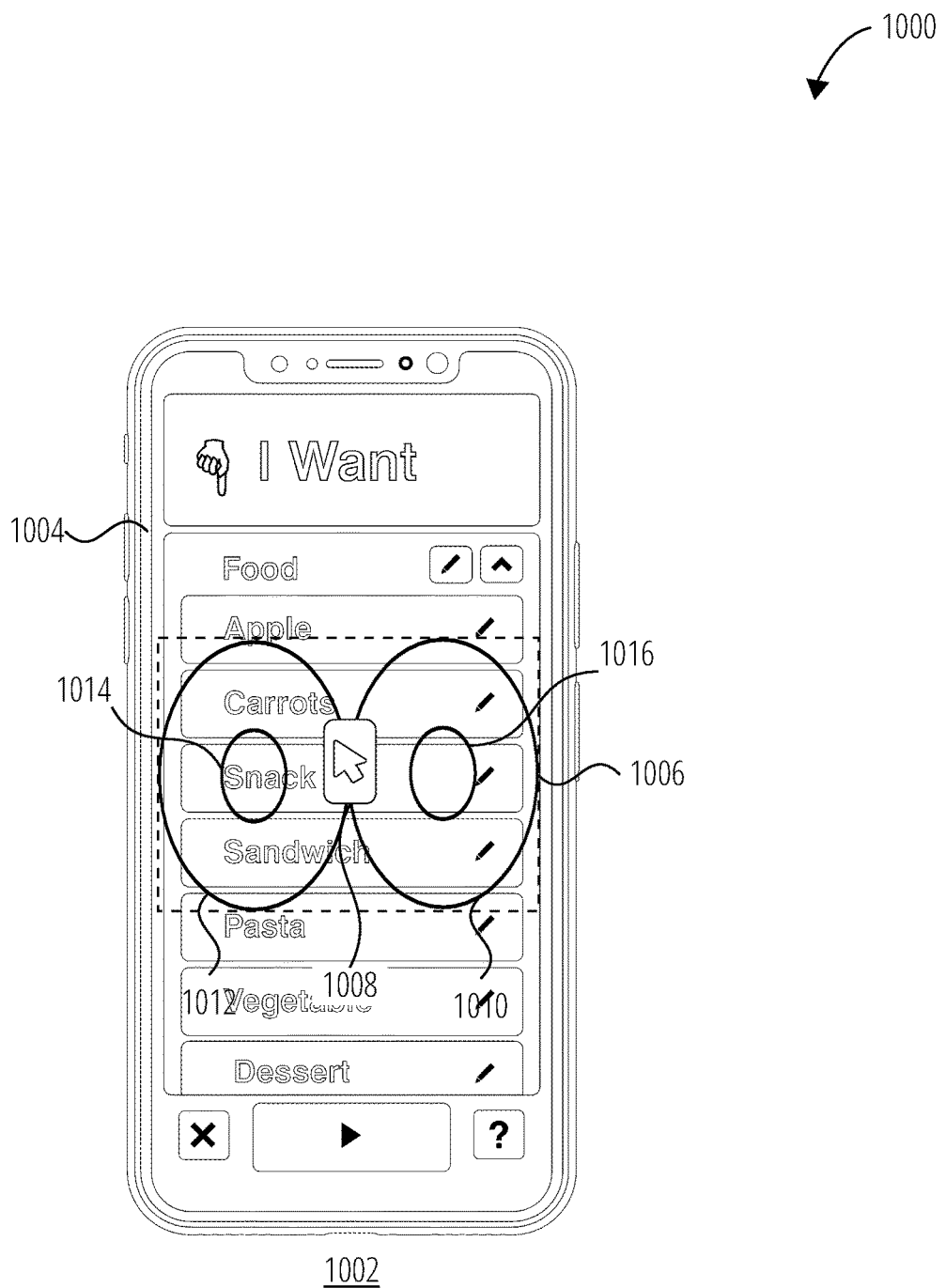
FIG. 10 illustrates a system 1000 in accordance with one embodiment.

FIG. 10 illustrates eye tracking map and pointer 900 for real-time eye tracking feedback with an eye-movement tracking camera. The system 1000 comprises a device 1002 with a device screen 1004. In the system 1000, the eye tracking map 1006 may be enlarged and affixed to near the center of the device screen 1004. The transparency of the eye tracking map 1006 may also be modified in order to reduce interference with the content displayed on the device screen 1004. The left eye tracking map 1012 and the right eye tracking map 1010 may be positioned side by side and the left eye movement information 1014 and the right eye movement information 1016 may reflect the user's eye movement relative to the eye tracking pointer 1008.

Figure 11:
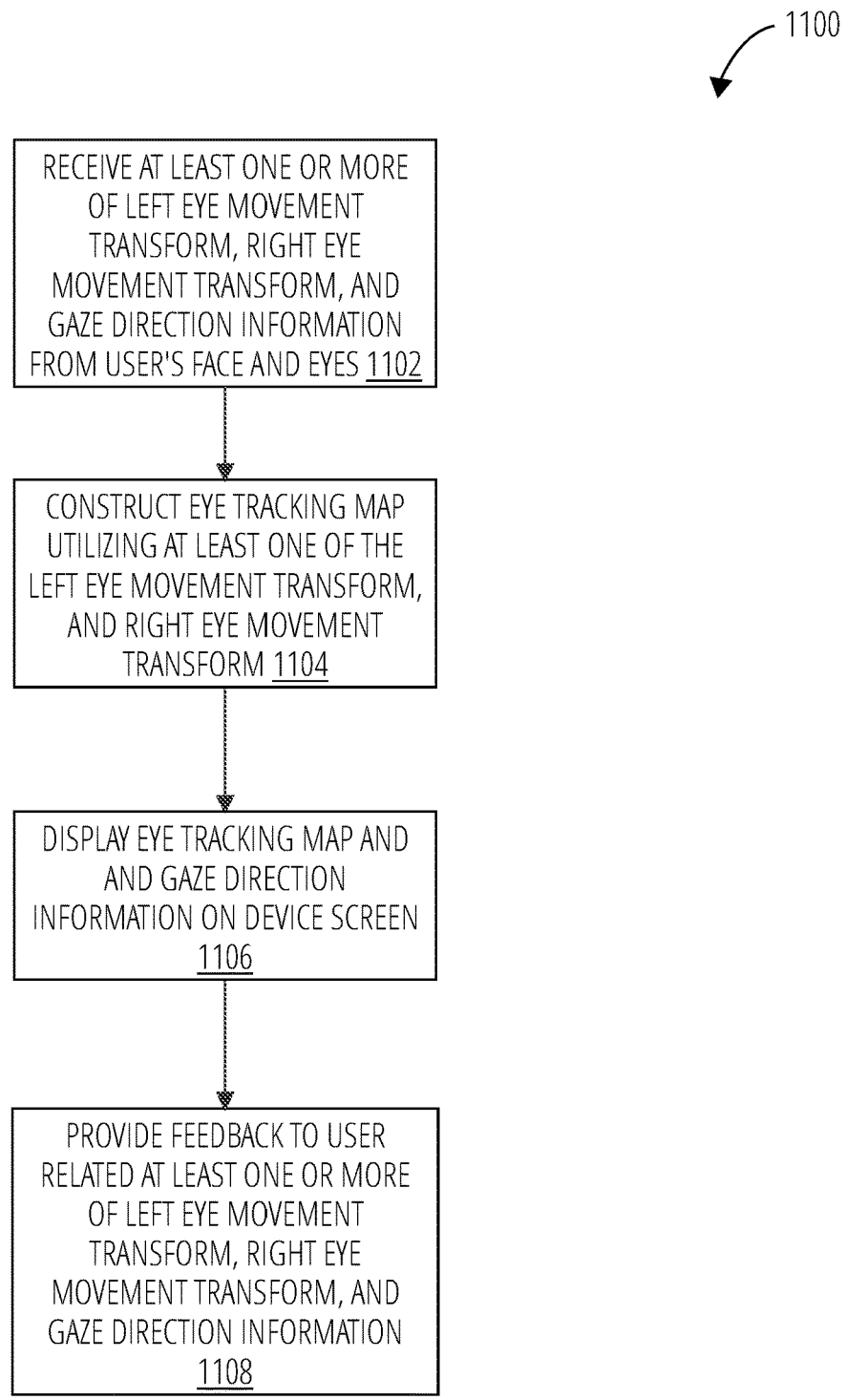
FIG. 11 illustrates a method 1100 in accordance with one embodiment.

Referencing FIG. 11, a method 1100 for operating a system for real-time eye tracking feedback with an eye-movement tracking camera may involve receiving at least one or more of a left eye movement transform, a right eye movement transform, and gaze direction information from a user's face and eyes (block 1102). In block 1104, method 1100 constructs an eye tracking map including at least one of the left eye movement transform, and the right eye movement transform. In block 1106, method 1100 displays the eye tracking map and the at least one or more of the left eye movement information, right eye movement information, and gaze direction information on a device screen. In block 1108, method 1100 provides feedback to the user related the at least one or more of left eye movement transform, right eye movement transform, and gaze direction information.

Figure 12:
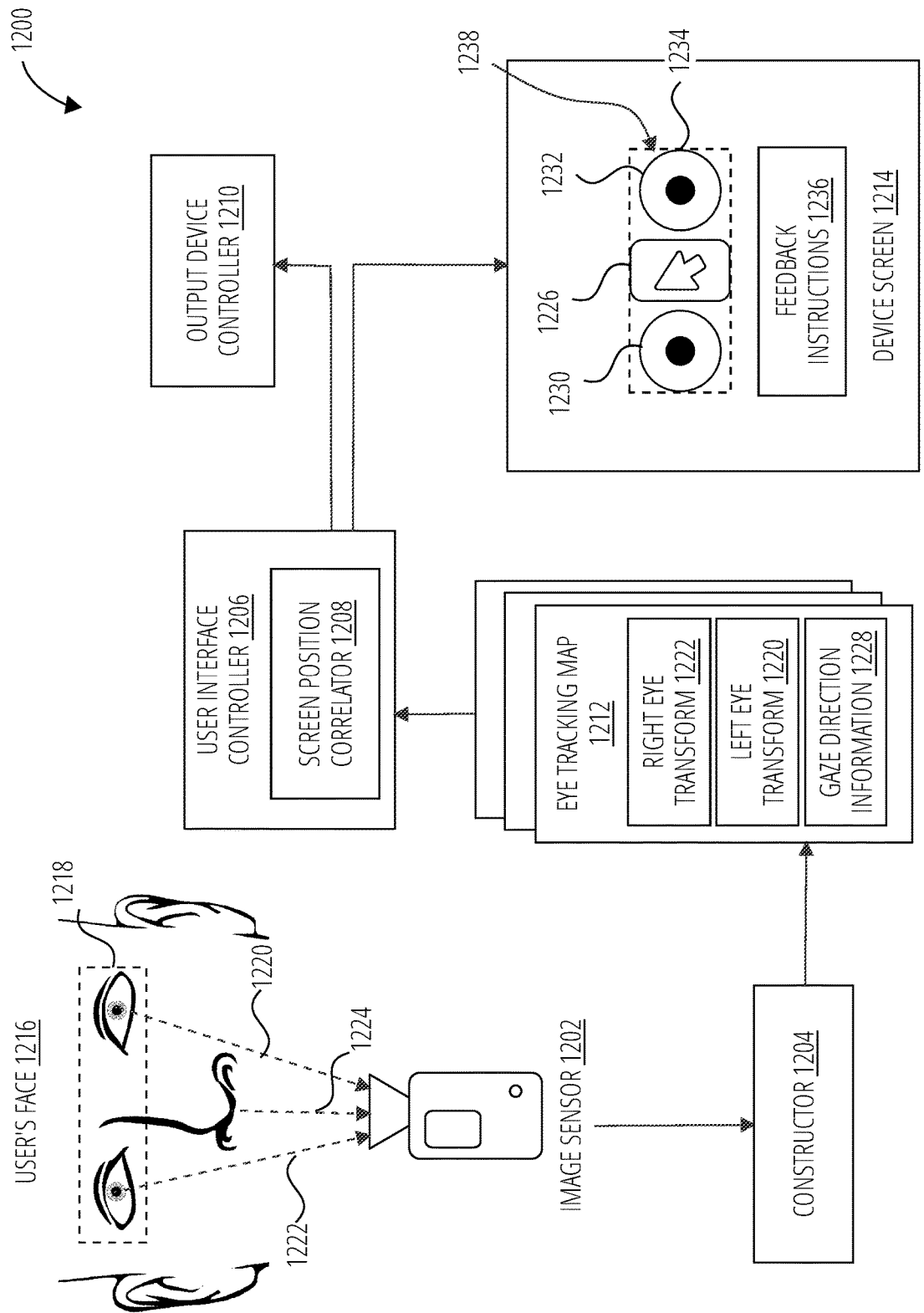
FIG. 12 illustrates a system 1200 in accordance with one embodiment.

FIG. 12 illustrates a system 1200 for real-time eye tracking feedback with an eye-movement tracking camera. The system 1200 comprises an image sensor 1202, a constructor 1204, a user interface controller 1206 comprising a screen position correlator 1208, an output device controller 1210, and a device screen 1214. The image sensor 1202 may receive right eye movement transform 1222, left eye movement transform 1220, and gaze direction information from a user's face 1216 and user's eyes 1218. The image sensor 1202 may communicate the right eye movement transform 1222, the left eye movement transform 1220, and the gaze direction information to a constructor 1204. The constructor 1204 may be utilized to generate an eye tracking map 1212 from the right eye movement transform 1222, the left eye movement transform 1220, and the gaze direction information. The eye tracking map 1212 comprising the right eye movement transform 1222, the left eye movement transform 1220, and the gaze direction information 1228 may then be communicated to the user interface controller 1206 comprising the screen position correlator 1208. The user interface controller 1206 communicates a display control to the device screen 1214 to display an eye tracking map and pointer 1234 comprising left eye movement information 1230, right eye movement information 1232, and eye tracking pointer 1226 at a screen position 1238. The screen position correlator 1208 may be utilized to determine the screen position 1238 of the eye tracking map and pointer 1234 on the device screen 1214 from the eye tracking map 1212. If the system 1200 detects a screen position that is outside of the device screen 1214 the user interface controller 1206 may communicate a feedback control to the device screen 1214 to display feedback instructions 1236 for aligning the user's sight back with the device screen 1214. In some configurations the user interface controller 1206 may communicate a feedback control to the output device controller 1210 to control additional visual, audio, and haptic devices to alert the user of the lost alignment. In some configurations, the image sensor 1202 may capture the user's nose position vector 1224 as part of the gaze direction information.

Figure 13:
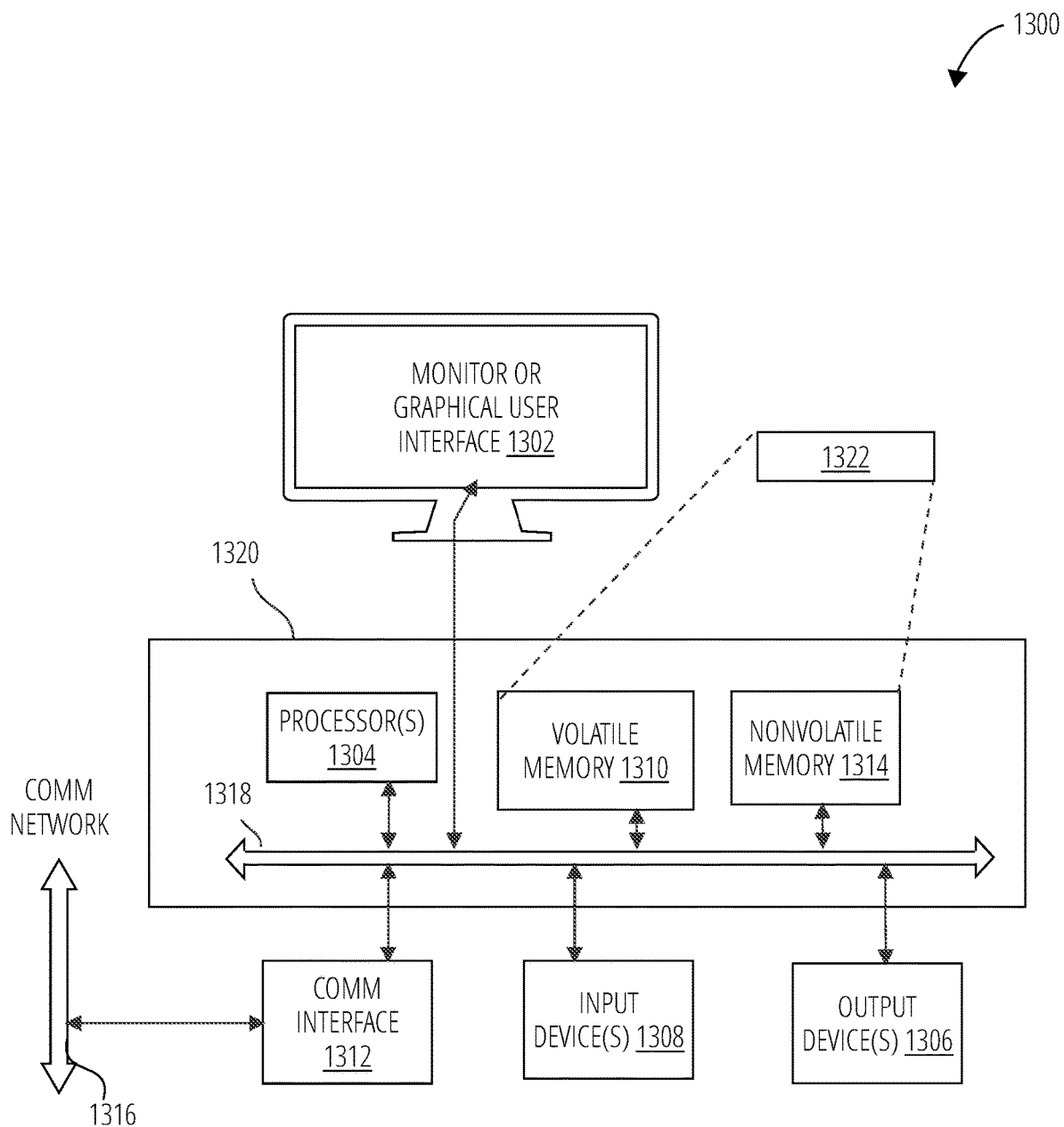
FIG. 13 is an example block diagram of a computing device 1300 that may incorporate embodiments of the present disclosure.

FIG. 13 is an example block diagram of a computing device 1300 that may incorporate embodiments of the present invention. FIG. 13 is merely illustrative of a machine system to carry out aspects of the technical processes described herein and does not limit the scope of the claims. One of ordinary skill in the art would recognize other variations, modifications, and alternatives. In one embodiment, the computing device 1300 typically includes a monitor or graphical user interface 1302, a data processing system 1320, a communication network interface 1312, input device(s) 1308, output device(s) 1306, and the like.

As depicted in FIG. 13, the data processing system 1320 may include one or more processor(s) 1304 that communicate with a number of peripheral devices via a bus subsystem 1318. These peripheral devices may include input device(s) 1308, output device(s) 1306, communication network interface 1312, and a storage subsystem, such as a volatile memory 1310 and a nonvolatile memory 1314.

The volatile memory 1310 and/or the nonvolatile memory 1314 may store computer-executable instructions and thus forming logic 1322 that when applied to and executed by the processor(s) 1304 implement embodiments of the processes disclosed herein.

The input device(s) 1308 include devices and mechanisms for inputting information to the data processing system 1320. These may include a keyboard, a keypad, a touch screen incorporated into the monitor or graphical user interface 1302, audio input devices such as voice recognition systems, microphones, and other types of input devices. In various embodiments, the input device(s) 1308 may be embodied as a computer mouse, a trackball, a track pad, a joystick, wireless remote, drawing tablet, voice command system, eye tracking system, and the like. The input device(s) 1308 typically allow a user to select objects, icons, control areas, text and the like that appear on the monitor or graphical user interface 1302 via a command such as a click of a button or the like.

The output device(s) 1306 include devices and mechanisms for outputting information from the data processing system 1320. These may include the monitor or graphical user interface 1302, speakers, printers, infrared LEDs, and so on as well understood in the art.

The communication network interface 1312 provides an interface to communication networks (e.g., communication network 1316) and devices external to the data processing system 1320. The communication network interface 1312 may serve as an interface for receiving data from and transmitting data to other systems. Embodiments of the communication network interface 1312 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 1312 may be coupled to the communication network 1316 via an antenna, a cable, or the like. In some embodiments, the communication network interface 1312 may be physically integrated on a circuit board of the data processing system 1320, or in some cases may be implemented in software or firmware, such as "soft modems", or the like.

The computing device 1300 may include logic that enables communications over a network using protocols such as HTTP, TCP/IP, RTP/RTSP, IPX, UDP and the like.

The volatile memory 1310 and the nonvolatile memory 1314 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMs, DVDs, semiconductor memories such as flash memories, non-transitory read-only-memories (ROMS), battery-backed volatile memories, networked storage devices, and the like. The volatile memory 1310 and the nonvolatile memory 1314 may be configured to store the basic programming and data constructs that provide the functionality of the disclosed processes and other embodiments thereof that fall within the scope of the present invention.

Logic 1322 that implements embodiments of the present invention may be stored in the volatile memory 1310 and/or the nonvolatile memory 1314. Said logic 1322 may be read from the volatile memory 1310 and/or nonvolatile memory 1314 and executed by the processor(s) 1304. The volatile memory 1310 and the nonvolatile memory 1314 may also provide a repository for storing data used by the logic 1322.

The volatile memory 1310 and the nonvolatile memory 1314 may include a number of memories including a main random access memory (RAM) for storage of instructions and data during program execution and a read only memory (ROM) in which read-only non-transitory instructions are stored. The volatile memory 1310 and the nonvolatile memory 1314 may include a file storage subsystem providing persistent (non-volatile) storage for program and data files. The volatile memory 1310 and the nonvolatile memory 1314 may include removable storage systems, such as removable flash memory.

The bus subsystem 1318 provides a mechanism for enabling the various components and subsystems of data processing system 1320 communicate with each other as intended. Although the communication network interface 1312 is depicted schematically as a single bus, some embodiments of the bus subsystem 1318 may utilize multiple distinct busses.

It will be readily apparent to one of ordinary skill in the art that the computing device 1300 may be a device such as a smartphone, a desktop computer, a laptop computer, a rack-mounted computer system, a computer server, or a tablet computer device. As commonly known in the art, the computing device 1300 may be implemented as a collection of multiple networked computing devices. Further, the computing device 1300 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/ or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method of real-time eye tracking feedback with an eye-movement tracking camera, the method comprising:
   receiving at least one or more of a left eye movement transform, a right eye movement transform, and gaze direction information from a user's face and user's eyes;
   constructing a focal point from the received at least one or more of a left eye movement transform, a right eye movement transform, and gaze direction information, wherein the focal point includes a calculated left eye position and a calculated right eye position;
   constructing an eye tracking map utilizing at least one or more of the left eye movement transform and the right eye movement transform, wherein the eye tracking map represents the position and movement of the left eye and the position and movement of the right eye, relative to the focal point, the eye tracking map including:
      at least one or more of left eye movement information, a left eye position relative to the eye tracking map, right eye movement information, and a right eye position relative to the eye tracking map;
   displaying the eye tracking map and the focal point information on a device including a device screen; and
   determining if the focal point is aligned with the eye tracking map:
      on condition the focal point and the eye tracking map are aligned:
         indicating to the user that the focal point is aligned with the eye tracking map;
      on condition the focal point and the eye tracking map are not aligned:
         providing feedback to the user related to at least one or more of the left eye movement transform, the right eye movement transform, and the gaze direction information, wherein the feedback alerts the user to a loss of alignment of the focal point to a position on the device screen.

2. The method of claim 1, wherein the feedback includes instructions to move a relative position of the device with respect to the user's eyes.

3. The method of claim 1, wherein the feedback includes at least one of a visual signal, an audio signal, and a haptic signal to the user.

4. The method of claim 3, wherein the visual signal includes displaying a recommended change, within the eye tracking map, of at least one of left eye movement information, the left eye position relative to the eye tracking map, right eye movement information, and the right eye position relative to the eye tracking map.

5. The method of claim 1, wherein the displaying includes adjusting the eye tracking map for a zooming action.

6. The method of claim 1, further comprising receiving information about a user's nose position vector.

7. A system for real-time eye tracking feedback with an eye-movement tracking camera comprising:
   an image sensor configured to receive at least one or more of a left eye movement transform, a right eye movement transform, and gaze direction information from a user's face and user's eyes;
   a processor; and
   a memory storing instructions that, when executed by the processor, configure the system to:
   receive, from the image sensor, at least one or more of the left eye movement transform, the right eye movement transform, and the gaze direction information from the user's face and the user's eyes;
   construct a focal point from the received at least one or more of a left eye movement transform, a right eye movement transform, and gaze direction information, wherein the focal point includes a calculated left eye position and a calculated right eye position;
   construct an eye tracking map utilizing at least one or more of the left eye movement transform and the right eye movement transform, wherein the eye tracking map represents the position and movement of the left eye and the position and movement of the right eye, relative to the focal point, the eye tracking map including:
   at least one or more of left eye movement information, a left eye position relative to the eye tracking map; right eye movement information; and a right eye position relative to the eye tracking map;
   display the eye tracking map and the focal point information on a device including a device screen; and
   determine if the focal point is aligned with the eye tracking map:
      on condition the focal point and the eye tracking map are aligned:
         indicate to the user that the focal point is aligned with the eye tracking map;
      on condition the focal point and the eye tracking map are not aligned:

provide feedback to the user related to at least one or more of the left eye movement transform, the right eye movement transform, and the gaze direction information, wherein the feedback alerts the user to a loss of alignment of the focal point to a position on the device screen.

8. The system of claim 7, where the system is configured to communicate the feedback control to an output device controller.

9. The system of claim 8, wherein the system generates feedback through at least one of a visual signal, an audio signal, and a haptic signal to the user.

10. The system of claim 9, wherein the visual signal includes displaying a recommended change, within the eye tracking map, of at least one of left eye movement information, the left eye position relative to the eye tracking map, right eye movement information, and the right eye position relative to the eye tracking map.

11. The system of claim 7, wherein the system is configured to adjust the eye tracking map for a zooming action.

12. The system of claim 7, wherein the system is configured to communicate the feedback control as feedback instructions to move a relative position of the device with respect to the user's eyes through the device screen.

13. The system of claim 7, wherein the image sensor receives information about a user's nose position vector.

14. An apparatus comprising: a processor; and
a memory storing instructions that, when executed by the processor, configure the apparatus to:
receive at least one or more of a left eye movement transform, a right eye movement transform, and gaze direction information from a user's face and eyes;
construct a focal point from the received at least one or more of a left eye movement transform, a right eye movement transform, and gaze direction information, wherein the focal point includes a calculated left eye position and a calculated right eye position;
construct an eye tracking map utilizing at least one or more of the left eye movement transform, and the right eye movement transform, wherein the eye tracking map represents the position and movement of the left eye and the position and movement of the right eye, relative to the focal point, the eye tracking map including:
at least one or more of left eye movement information, a left eye position relative to the eye tracking map, right eye movement information, and a right eye position relative to the eye tracking map;
display the eye tracking map and the focal point information on a device including a device screen; and
determine if the focal point is aligned with the eye tracking map:
on condition the focal point and the eye tracking map are aligned:
indicate to the user that the focal point is aligned with the eye tracking map;
on condition the focal point and the eye tracking map are not aligned:
provide feedback to the user related at least one or more of the left eye movement transform, the right eye movement transform, and the gaze direction information, wherein the feedback alerts the user to a loss of alignment of the focal point to a position on the device screen.

15. The apparatus of claim 14, wherein the feedback includes instructions to move a relative position of the device with respect to the user's eyes.

16. The apparatus of claim 14, wherein the feedback includes at least one of a visual signal, an audio signal, and a haptic signal to the user.

17. The apparatus of claim 16, wherein the visual signal includes displaying a recommended change, within the eye tracking map, of at least one of left eye movement information, the left eye position relative to the eye tracking map, right eye movement information, and the right eye position relative to the eye tracking map.

18. The apparatus of claim 14, wherein the instructions further configure the apparatus to adjust the display of the eye tracking map for a zooming action.

19. The apparatus of claim 14, wherein the instructions further configure the apparatus to receive information about a user's nose position vector.

* * * * *